US012623234B2

(12) United States Patent
Jeong et al.

(10) Patent No.: US 12,623,234 B2
(45) Date of Patent: May 12, 2026

(54) CONTINUOUS CENTRIFUGAL DEWATERING DEVICE

(71) Applicant: LG CHEM, LTD., Seoul (KR)

(72) Inventors: Sung Woo Jeong, Daejeon (KR); Kee Sung Cho, Daejeon (KR); In Yong Jeong, Daejeon (KR); Sang Hyeon Kang, Daejeon (KR); Eun Jung Joo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1023 days.

(21) Appl. No.: 17/770,417

(22) PCT Filed: Aug. 20, 2021

(86) PCT No.: PCT/KR2021/011078

§ 371 (c)(1), (2) Date: Apr. 20, 2022

(87) PCT Pub. No.: WO2022/075582

PCT Pub. Date: Apr. 14, 2022

(65) Prior Publication Data

US 2022/0388014 A1 Dec. 8, 2022

(30) Foreign Application Priority Data

Oct. 5, 2020 (KR) ........................ 10-2020-0128011

(51) Int. Cl.
*B04B 3/02* (2006.01)
*B04B 1/12* (2006.01)
(Continued)

(52) U.S. Cl.
CPC .................. *B04B 3/02* (2013.01); *B04B 1/12* (2013.01); *B04B 7/16* (2013.01); *B04B 15/12* (2013.01); *F26B 5/08* (2013.01)

(58) Field of Classification Search
CPC .... B04B 3/02; B04B 1/12; B04B 7/16; B04B 15/12; F26B 5/08
See application file for complete search history.

(56) References Cited

U.S. PATENT DOCUMENTS 4,320,007 A 3/1982 Hultsch et al.
4,434,052 A 2/1984 Mulhaupt
(Continued)

FOREIGN PATENT DOCUMENTS

CH 205982 A 7/1939
CN 101208571 A 6/2008
(Continued)

OTHER PUBLICATIONS

KR 10-2020-0099563_English translation (Year: 2020).*
(Continued)

*Primary Examiner* — Youngsul Jeong
(74) *Attorney, Agent, or Firm* — Morgan, Lewis & Bockius LLP

(57) ABSTRACT

Disclosed is a continuous centrifugal dewatering device including an external case having an internal space, a feed supply pipe to which a slurry as a mixture of a solid and a liquid is supplied, a basket provided inside the external case, a plurality of holes formed in the basket, a pusher plate provided inside the basket and configured to discharge a slurry cake attached to an inner circumferential surface of the basket to the outside of the external case, a non-contact seal configured to prevent the first gas from flowing into a space between the external case and the basket, and a gas inlet to which a second gas, which flows in a reverse direction with respect to a flow direction of the first gas flowing to the space between the external case and the basket, is supplied.

9 Claims, 3 Drawing Sheets

(51) Int. Cl.

| | |
|---|---|
| ***B04B 7/16*** | (2006.01) |
| ***B04B 15/12*** | (2006.01) |
| ***F26B 5/08*** | (2006.01) |

(56) References Cited

U.S. PATENT DOCUMENTS

| | | | | |
|---|---|---|---|---|
| 5,356,366 | A | 10/1994 | Stahl | |
| 5,397,471 | A | 3/1995 | Rodebush et al. | |
| 5,401,423 | A | 3/1995 | Leung et al. | |
| 5,988,398 | A * | 11/1999 | Gerteis | B04B 3/025 494/83 |
| 6,159,360 | A * | 12/2000 | Gerteis | B04B 3/025 34/550 |
| 6,514,421 | B2 | 2/2003 | Leung et al. | |
| 7,017,756 | B2 | 3/2006 | Reinach et al. | |
| 2009/0045147 | A1 | 2/2009 | Schmid | |
| 2009/0211961 | A1 | 8/2009 | Yamazaki et al. | |
| 2017/0312760 | A1 | 11/2017 | Eliasson et al. | |

FOREIGN PATENT DOCUMENTS

| | | | | |
|---|---|---|---|---|
| CN | 101370593 | A | 2/2009 | |
| CN | 203862419 | U | 10/2014 | |
| CN | 107073484 | A | 8/2017 | |
| CN | 107158761 | A | 9/2017 | |
| CN | 109311031 | A | 2/2019 | |
| EP | 1 468 743 | A1 | 10/2004 | |
| EP | 374145 | A | 11/2020 | |
| GB | 1 518 239 | A | 7/1978 | |
| JP | 54-043670 | U | 3/1979 | |
| JP | H08-192077 | A | 7/1996 | |
| JP | 1999-023152 | A | 1/1999 | |
| JP | 2001-503327 | A | 3/2001 | |
| JP | 2001-509068 | A | 7/2001 | |
| JP | 6217416 | B2 | 10/2017 | |
| JP | 2019-122923 | A | 7/2019 | |
| KR | 10-1998-0032005 | A | 7/1998 | |
| KR | 10-2000-0024471 | A | 5/2000 | |
| KR | 10-2006-0089881 | A | 8/2006 | |
| KR | 10-1492606 | B1 | 2/2015 | |
| KR | 10-2020-0099563 | * | 8/2020 | B04B 15/12 |
| KR | 10-2020-0099563 | A | 8/2020 | |

OTHER PUBLICATIONS

Office Action for Chinese Patent Application No. 202180006131.9 dated May 22, 2024.

Extended European Search Report issued in corresponding European Patent Application No. 21876744.0 dated Dec. 13, 2022, 6 pages.

JP Notice of Allowance and Grant for Japanese Patent Application No. 2022-525435 dated Oct. 30, 2023.

International Search Report and Written Opinion issued in corresponding International Patent Application No. PCT/KR2021/011078, dated Nov. 30, 2021.

Office Action issued on Jan. 30, 2024 in Chinese Patent Application No. 202180006131.9 with English translation Note: U.S. Pat. No. 6159360A and U.S. Pat. No. 5988398A cited therein are already of record.

* cited by examiner

【FIG. 1】
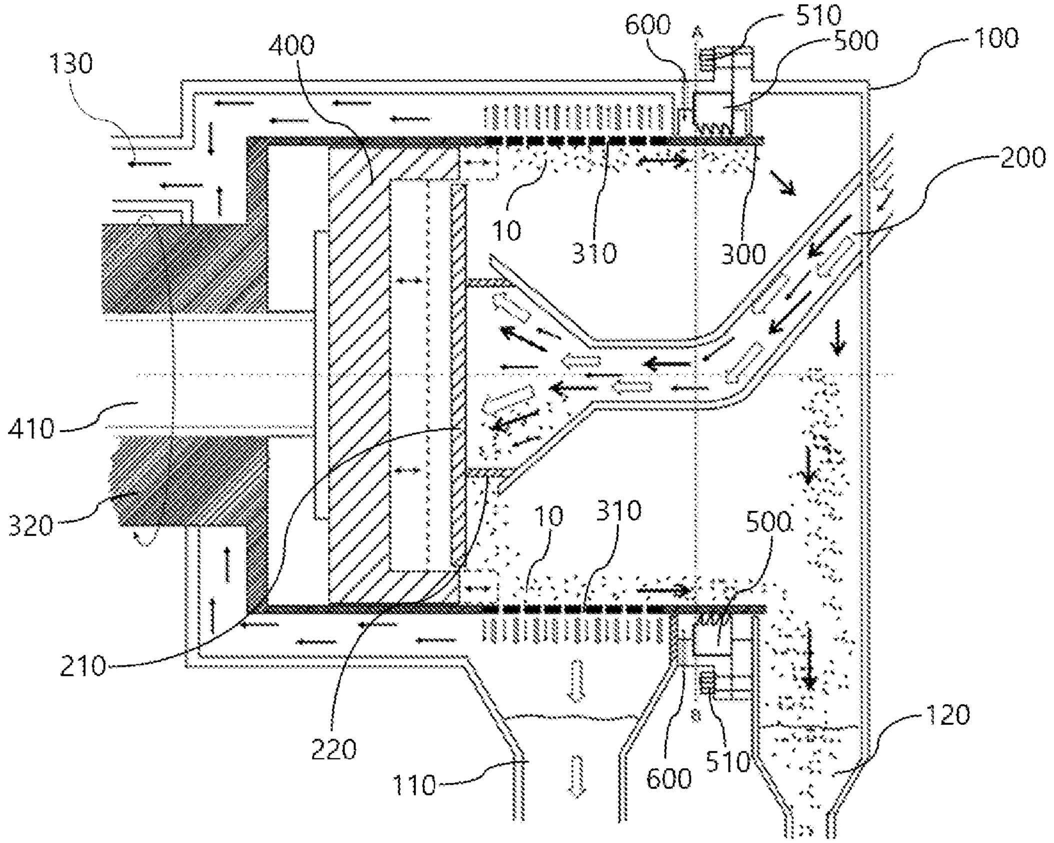

【FIG. 2】
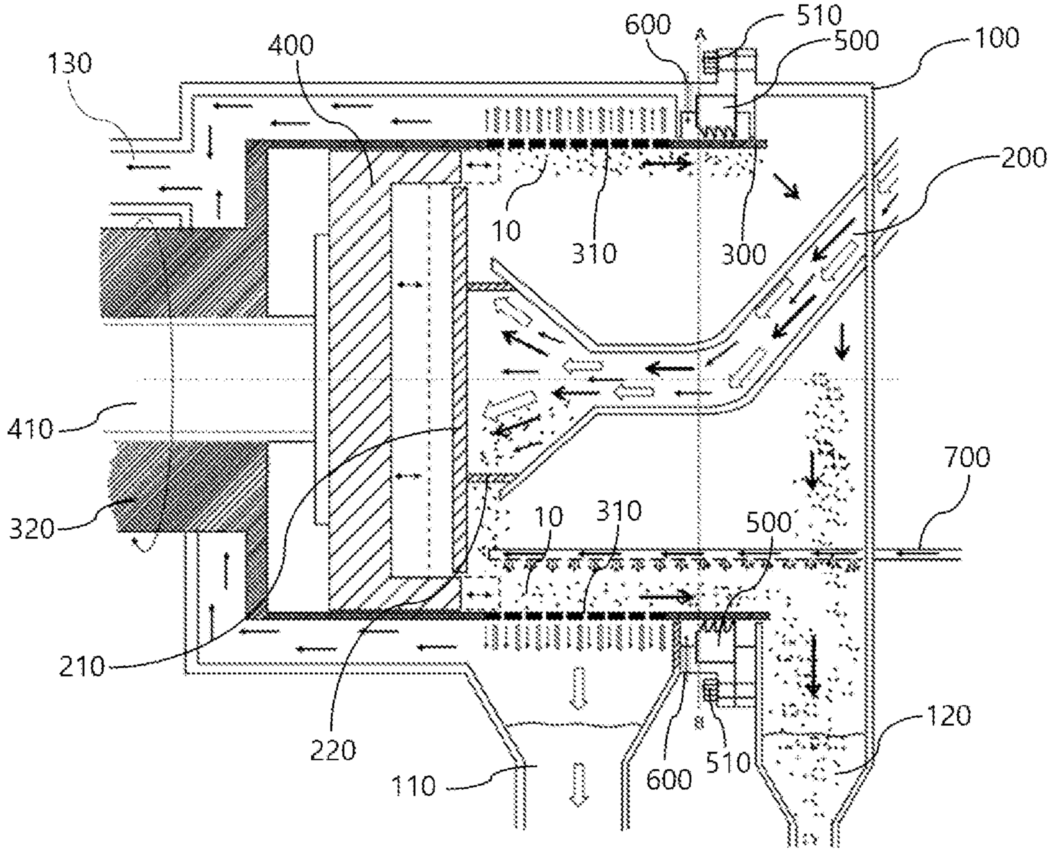

【FIG. 3】
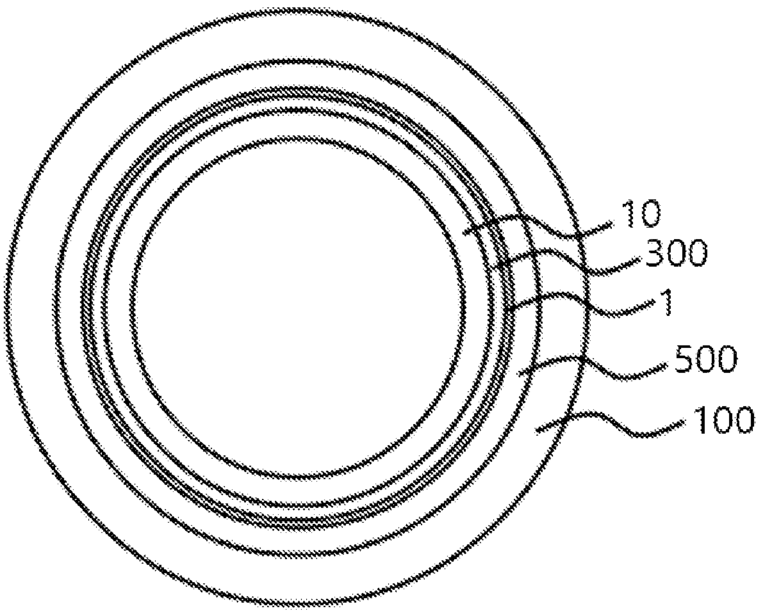
【FIG. 4】
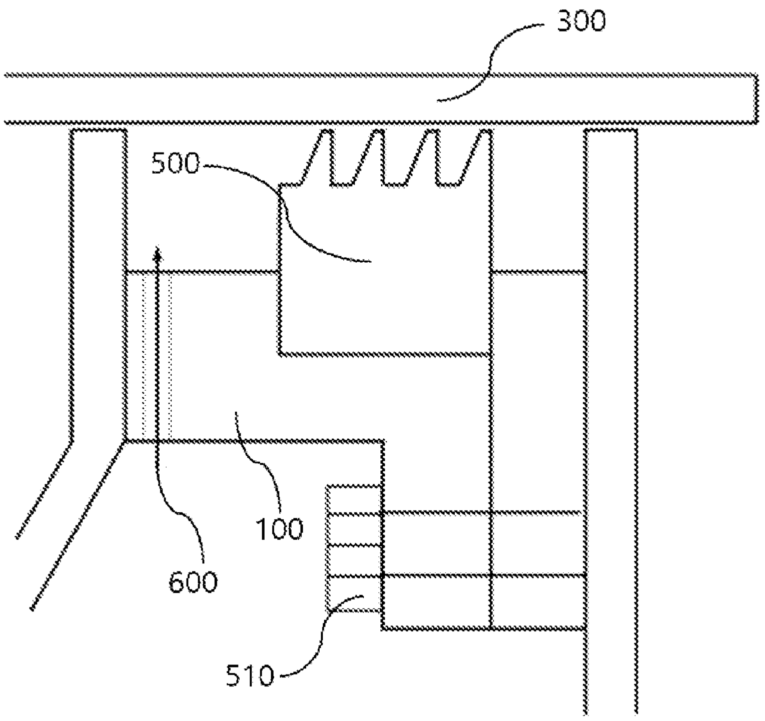

CONTINUOUS CENTRIFUGAL DEWATERING DEVICE

TECHNICAL FIELD

Cross-Reference to Related Application

The present application claims priority to Korean Patent Application No. 10-2020-0128011, filed on Oct. 5, 2020, the entire contents of which are incorporated herein for all purposes by this reference.

Technical Field

The present invention relates to a continuous centrifugal dewatering device (or a continuous centrifugal spin dryer), and more particularly, to a continuous centrifugal dewatering device having improved dewatering efficiency of a polymer slurry.

Background Art

In general, a process of producing polymers includes polymerization, agglomeration, dewatering, and drying processes, and a polymer slurry produced through the polymerization and agglomeration processes contains a large amount of moisture.

During the drying process, a hot air drying method is generally used, which, however, incurs high energy cost, and thus, removing moisture of the polymer slurry as much as possible to lower a moisture content thereof during the dewatering process prior to performing the drying process is the key to improving economical efficiency of the processes.

As described above, a slurry cake having a low moisture content by removing a portion of moisture from the polymer slurry during the dewatering process may undergo a drying process so as to be obtained as a powdery polymer solid having a moisture content of less than 1%.

During the dewatering process, it is common to go through a centrifugal dewatering device to primarily remove moisture, and among the centrifugal dewatering devices, a pusher-type continuous centrifugal dewatering device capable of performing a continuous process is used to increase productivity.

However, since the continuous centrifugal dewatering device of the related art simply dewaters using only centrifugal force, the dewatering efficiency is not excellent to lead to a problem that high energy cost is consumed during the drying process. In addition, when pores are developed inside polymer particles in the polymer slurry, moisture contained in the pores increases to lower the dewatering efficiency.

Therefore, there is a need to develop a continuous centrifugal dewatering device capable of solving the above problems.

DISCLOSURE

Technical Problem

An object of the present invention is to provide a continuous centrifugal dewatering device capable of improving dewatering efficiency of a slurry by using pressure and a blowing effect of a gas, as well as centrifugal force, by supplying the gas together with the slurry.

Technical Solution

In one general aspect, a continuous centrifugal dewatering device includes: an external case having an internal space; a feed supply pipe to which a slurry as a mixture of a solid and a liquid is supplied; a basket provided inside the external case, configured to receive a first gas and the slurry provided thereto and rotate to apply centrifugal force to the slurry; a plurality of holes formed in the basket and configured to discharge a liquid filtered from the slurry to the outside of the basket; a pusher plate provided inside the basket and configured to discharge a slurry cake attached to an inner circumferential surface of the basket to the outside of the external case; a non-contact seal configured to prevent the first gas from flowing into a space between the external case and the basket; and a gas inlet to which a second gas, which flows in a reverse direction with respect to a flow direction of the first gas flowing to the space between the external case and the basket, is supplied.

Advantageous Effects

In the continuous centrifugal dewatering device according to the present invention, a gas is supplied together with a slurry to improve the dewatering efficiency of the slurry by not only centrifugal force but also pressure and a blowing effect of the gas.

That is, by using the continuous centrifugal dewatering device according to the present invention during a dewatering process, it is possible to obtain a slurry having a moisture content as low as possible, thereby reducing energy consumed in a subsequent drying process.

DESCRIPTION OF DRAWINGS

FIG. 1 is a longitudinal cross-sectional view of a continuous centrifugal dewatering device according to an embodiment of the present invention.

FIG. 2 is a longitudinal cross-sectional view of a continuous centrifugal dewatering device further including a gas supply pipe according to an embodiment of the present invention.

FIG. 3 is a cross-sectional view of a continuous centrifugal dewatering device according to an embodiment of the present invention.

FIG. 4 is an enlarged view showing a coupling relationship between a non-contact seal and an external case according to an embodiment of the present invention.

BEST MODE

Terms and words used in the present specification and claims are not to be construed as a general or dictionary meaning but are to be construed as meaning and concepts meeting the technical ideas of the present invention based on a principle that the inventors may appropriately define the concepts of terms in order to describe their own inventions in the best mode.

In the present invention, the term "slurry" may refer to a mixture of solid and liquid or a suspension in which fine solid particles are suspended in a liquid, and a "polymer slurry" may refer to a mixture of a solvent used in a polymerization and a solid such as a polymer generated by a polymerization or a suspension in which the solids are suspended in the solvent.

In the present invention, the term "slurry cake" may refer to a solid after dewatering and filtration of the slurry.

Hereinafter, the present invention will be described in more detail with reference to the following drawings in order to help understand the present invention.

According to the present invention, a continuous centrifugal dewatering device is provided. The continuous centrifugal dewatering device includes: an external case 100 having an internal space; a feed supply pipe 200 to which a slurry as a mixture of a solid and a liquid is supplied; a basket 300 provided inside the external case 100, configured to receive a first gas and the slurry provided thereto and rotate to apply centrifugal force to the slurry; a plurality of holes 310 formed in the basket 300 and configured to discharge a liquid filtered from the slurry to the outside of the basket 300; a pusher plate 400 provided inside the basket 300 and configured to discharge a slurry cake 10 attached to an inner circumferential surface of the basket 300 by centrifugal force to the outside of the external case 100; a non-contact seal 500 configured to prevent the first gas from flowing into a space between the external case 100 and the basket 300; and a gas inlet 600 to which a second gas, which flows in a reverse direction with respect to a flow direction of the first gas flowing to the space between the external case 100 and the basket 300, is supplied.

In general, a process of producing a polymer includes polymerization, agglomeration, dewatering and drying processes, and a polymer slurry produced through the polymerization and agglomeration processes contains a large amount of moisture.

During the drying process, a hot air drying method is generally used, which, however, incurs high energy cost, and thus, removing moisture of the polymer slurry as much as possible to lower a moisture content thereof during the dewatering process prior to performing the drying process is the key to improving economical efficiency of the processes.

As described above, a slurry cake having a low moisture content by removing a portion of moisture from the polymer slurry during the dewatering process may undergo a drying process so as to be obtained as a powdery polymer solid having a moisture content of less than 1%.

During the dewatering process, it is common to go through a centrifugal dewatering device to primarily remove moisture, and among the centrifugal dewatering devices, a pusher-type continuous centrifugal dewatering device capable of performing a continuous process is used to increase productivity.

However, since the continuous centrifugal dewatering device of the related art simply dewaters using only centrifugal force, the dewatering efficiency is not excellent to lead to a problem that high energy cost is consumed during the drying process. In addition, when pores are developed inside polymer particles in the polymer slurry, moisture contained in the pores increases to lower the dewatering efficiency.

Therefore, the present invention provides a continuous centrifugal dewatering device capable of improving dewatering performance of a slurry by supplying the slurry together with a gas. That is, by using the continuous centrifugal dewatering device according to the present invention during a dewatering process, it is possible to obtain a slurry having a moisture content as low as possible, thereby reducing energy consumed in a subsequent drying process.

According to an embodiment of the present invention, the continuous centrifugal dewatering device according to the present invention may be a continuous centrifugal dewatering device in which a slurry containing a solid and a liquid and a first gas are supplied together to improve dewatering efficiency of the slurry using pressure and blowing effect of the first gas, as well as centrifugal force.

As a specific example, the continuous centrifugal dewatering device may be a device for applying centrifugal force to the slurry to separate a liquid contained in the slurry by a difference in specific gravity and generate and discharge the slurry cake 10 without the liquid. As a more specific example, in addition to the slurry, a first gas may be additionally supplied to provide an additional dewatering effect to the slurry by pressure and blowing effect of the gas.

According to an embodiment of the present invention, the continuous centrifugal dewatering device according to the present invention may include an external case 100 having an internal space.

The external case 100 may include a liquid outlet 110 through which a liquid filtered from the slurry is discharged, a slurry cake outlet 120 through which the slurry cake 10 is discharged, and a gas outlet 130 through which the first gas is discharged.

According to an embodiment of the present invention, the continuous centrifugal dewatering device according to the present invention may include a feed supply pipe 200 to which a slurry of a mixture of solid and water is supplied.

The feed supply pipe 200 may extend into the inside of the basket 300 to be described later to supply the slurry into the inside of the basket 300. As described above, the slurry may be formed by mixing a solid and a liquid, and as a specific example, the slurry may be a polymer slurry produced by a polymerization.

According to an embodiment of the present invention, the continuous centrifugal dewatering device according to the present invention may include the basket 300 provided inside the external case 100, receiving the first gas and the slurry supplied thereto, and rotating to apply centrifugal force to the slurry.

For example, the basket 300 may have a cylindrical shape. As a more specific example, the basket 300 may apply centrifugal force to the slurry, while rotating, the slurry is attached to an inner circumferential surface of the basket 300 by centrifugal force and a liquid is filtered from the slurry through the plurality of holes 310 to be described later, and the filtered liquid may be discharged to the outside of the basket 300.

The basket 300 may include a rotation driving unit 320 for performing a rotational motion of the basket 300. For example, the rotation driving unit 320 may include a power unit (not shown) and a power transmission unit (not shown), but the rotation driving unit is not limited thereto and may include any unit capable of performing a rotational motion of the basket 300.

According to an embodiment of the present invention, the continuous centrifugal dewatering device according to the present invention may include the plurality of holes 310 formed in the basket 300 and discharging the liquid filtered from the slurry to the outside of the basket 300.

For example, when the basket 300 has a cylindrical shape, a plurality of holes 310 may be formed along a circumference of the basket 300. In this case, the plurality may refer to one or more. That is, the plurality of holes 310 may refer to one or more holes.

The plurality of holes 310 may include holes having a diameter through which the liquid filtered from the slurry passes and the slurry cake 10 attached to the inner circumferential surface of the basket 300 does not pass. Accordingly, the slurry cake 10 may not be discharged through the plurality of holes 310 and only the liquid may be discharged.

As described above, the liquid may be filtered from the slurry through the plurality of holes 310 included in the basket 300, and the filtered liquid may be discharged to the outside of the basket 300, that is, a space between the basket 300 and the external case 100.

According to an embodiment of the present invention, the continuous centrifugal dewatering device according to the present invention may include the pusher plate 400 provided inside the basket 300 and discharging the slurry cake 10 attached to the inner circumferential surface of the basket 300 to the outside of the external case 100.

The continuous centrifugal dewatering device may filter the liquid from the slurry by centrifugal force to form the slurry cake 10 in which the liquid is filtered out. As a specific example, centrifugal force may be applied to the slurry by a rotational motion of the basket 300, and accordingly, the slurry may be attached to the inner circumferential surface of the basket 300 by a force distributed in a direction of the inner circumferential surface of the basket 300, and, at the same time, the liquid included in the slurry may be discharged through the plurality of holes 310 included in the basket 300. Here, the slurry cake 10 without a liquid may be attached to the inner circumferential surface of the basket 300 without being discharged to the outside of the basket 300.

In this manner, a reciprocating motion of the pusher plate 400 may be performed to discharge the slurry cake 10 attached to the inner circumferential surface of the basket 300 to the outside of the external case 100, that is, to the outside of the continuous centrifugal dewatering device.

For example, the liquid included in the slurry supplied through the feed supply pipe 200 may be filtered out, i.e., separated, by centrifugal force due to the rotational motion of the basket 300, and thus, the slurry cake 10 attached to and formed on the inner circumferential surface of the basket 300 may be discharged to the outside of the continuous centrifugal dewatering device by the reciprocating motion of the pusher plate 400.

Here, after the liquid is discharged to the space between the basket 300 and the external case 100, the liquid may be discharged to the outside of the external case 100, i.e., to the outside of the continuous centrifugal dewatering device through the liquid outlet 110 included in the external case 100.

In addition, the slurry cake 10 may be discharged to the outside of the external case 100, i.e., to the outside of the continuous centrifugal dewatering device, through the slurry cake outlet 120 included in the external case 100 by the reciprocating motion of the pusher plate 400. The pusher plate 400 may perform a continuous reciprocating motion, and thus the slurry cake 10 may be continuously discharged.

The pusher plate 400 may include a pusher system 410 for reciprocating the pusher plate 400. For example, the pusher system 410 may include a power unit (not shown) and a power transmission unit (not shown), but is not limited thereto, and may include any unit capable of performing a reciprocating motion of the pusher plate 400.

According to an embodiment of the present invention, the continuous centrifugal dewatering device according to the present invention may further include a dispersing plate 210 provided inside the basket 300 and dispersing the slurry supplied from the feed supply pipe 200 in the basket 300.

The dispersing plate 210 may serve to uniformly disperse the slurry supplied from the feed supply pipe 200 in the inside of the basket 300, while being reflected by the dispersing plate 210. As such, since the slurry is uniformly dispersed inside the basket 300, the slurry to which centrifugal force is applied may be attached to the inner circumferential surface of the basket 300 with a uniform thickness, thereby maximally improving dewatering performance.

The dispersing plate 210 may further include a support 220 connected to the feed supply pipe 200 to support the dispersing plate 210. That is, the dispersing plate 210 may be fixed to the inside of the basket 300 by the support 220 connected to the feed supply pipe 200.

According to an embodiment of the present invention, the continuous centrifugal dewatering device according to the present invention may additionally supply a first gas to the inside of the basket 300.

In addition, the continuous centrifugal dewatering device according to the present invention may further include a gas supply pipe 700 for supplying the first gas to the inside of the basket 300.

Accordingly, the first gas may be mixed with the slurry to form a mixed feed so as to be supplied to the feed supply pipe 200 or may be independently supplied through the gas supply pipe 700. Here, if even the first gas is independently supplied through the gas supply pipe 700, the first gas may be mixed with the slurry supplied to the feed supply pipe 200 by the rotational motion of the basket 300.

The gas supply pipe 700 may extend into the inside of the basket 300 to supply the first gas to the inside of the basket 300, and the first gas supplied to the inside of the basket 300 may be discharged to the outside through the plurality of holes 310 included in the basket 300 or through the gas outlet 130 included in the external case 100 after passing through the space between the external case 100 and the basket 300.

As a specific example, the gas supply pipe 700 may include a plurality of pores formed in a longitudinal direction. In this case, the first gas may be uniformly supplied to the inside of the basket 300 through the plurality of pores, and thus, the first gas may be uniformly mixed with the slurry.

As such, when the first gas is additionally supplied in addition to the slurry supplied to the inside of the basket 300, the dewatering efficiency of the slurry may be improved by using the pressure and blowing effect of the first gas as well as centrifugal force.

Specifically, when the first gas is supplied to the inside of the basket 300, pressure of the first gas may act on the slurry dispersed in the inner circumferential direction of the basket 300 by centrifugal force to further improve the operation of filtering the liquid from the slurry. In addition, the dewatering effect by blowing may be added to the slurry cake 10 in the process in which the first gas passes through the slurry cake 10 attached to the inner circumferential surface of the basket 300 by centrifugal force and is discharged through the plurality of holes 310 of the basket 300.

According to an embodiment of the present invention, the continuous centrifugal dewatering device according to the present invention may include the non-contact seal 500 preventing the first gas from flowing into the space between the external case 100 and the basket 300.

As described above, the first gas supplied into the basket 300 may pass through the space between the external case 100 and the basket 300 in addition to the plurality of holes 310 included in the basket 300, and then be discharged to the outside through the gas outlet 130 included in the external case 100. In this case, a problem arises in that the dewatering effect may be reduced due to the blowing that occurs in the process in which the first gas passes through the slurry cake 10 attached to the inner circumferential surface of the basket 300 and is discharged through the plurality of holes 310 of the basket 300.

In order to solve this problem, in the present invention, the non-contact seal 500 is provided in the space between the external case 100 and the basket 300 to prevent the first gas from flowing into the space between the external case 100 and the basket 300, thereby increasing a flow rate of the first gas passing through the slurry cake 10. Accordingly, there is an effect of improving the dewatering effect acting on the slurry cake 10.

The non-contact seal 500 may be attached to the external case 100 and spaced apart from the basket 300 or may be attached to the basket 300 and spaced apart from the external case 100. As such, when a space 1 exists between the non-contact seal 500 and the basket 300, frictional contact between the non-contact seal 500 and the basket 300 due to the rotational motion of the basket 300 may be reduced to prevent a deterioration of durability, thereby improving long-term operation characteristics of the continuous centrifugal dewatering device. In addition, when a space exists between the non-contact seal 500 and the external case 100, frictional contact between the non-contact seal 500 and the external case 100 due to the rotational motion of the basket 300 may be reduced to prevent a deterioration of durability, thereby improving long-term operation characteristics of the continuous centrifugal dewatering device.

For example, referring to FIG. 3 showing a cross-sectional view in an A-B direction of the continuous centrifugal dewatering device according to the present invention shown in FIG. 1, since the space 1 exists between the non-contact seal 500 and the basket 300, frictional contact between the non-contact seal 500 and the basket 300 due to the rotational motion of the basket 300 may be prevented.

In addition, FIG. 4 shows an embodiment in which the non-contact seal 500 is attached to the external case 100. Referring to FIG. 4, the non-contact seal 500 may be attached to the external case 100 or the basket 300 by coupling using a bolt 510 or the like. In a specific example, a portion of the external case 100 may be divided, the non-contact seal 500 may be inserted into the portion of the divided external case 100, and the divided external case 100 may be coupled using the bolt 510 or the like, thereby fixing the non-contact seal 500, but an attaching method of the non-contact seal 500 is not limited thereto.

The non-contact seal 500 may be provided, for example, in a labyrinth shape and may be formed of white metal, brass pins, nickel pins, or the like. As shown in FIG. 4, the non-contact seal 500 may have a sharp shape in a direction adjacent to a contact portion, so that even if the non-contact seal 500 comes into contact with a component of the continuous centrifugal dewatering device, only the contact portion of the non-contact seal 500 may melt to prevent damage of the external case 100 or the basket 300 that may come into contact with the non-contact seal 500 due to frictional contact.

According to an embodiment of the present invention, the continuous centrifugal dewatering device according to the present invention may include the gas inlet 600 through which a second gas, which flows in a reverse direction with respect to a flow direction of the first gas flowing to the space between the external case 100 and the basket 300, is supplied.

Even if the non-contact seal 500 is provided in the space between the external case 100 and the basket 300, the space exists to be separated from the basket 300 or the external case 100 as described above. Therefore, in order to prevent the first gas from flowing into the space, a flow path of the first gas may be changed into the inside of the basket 300 by supplying the second gas flowing in the reverse direction with respect to the flow direction of the first gas.

For example, when the basket 300 has a cylindrical shape, the gas inlet 600 may be provided in the form of one or more pores formed along the circumference of the basket 300, but is not limited thereto.

In this manner, when the second gas is supplied through the gas inlet 600, a flow rate at which the first gas flows into the space between the external case 100 and the basket 300 may be reduced by 80% or more, 90% or more, or 95% or more, compared to the case where the second gas is not supplied.

The second gas supplied through the gas inlet 600 may pass through the slurry cake 10 attached to the inner circumferential surface of the basket 300 and be discharged through the plurality of holes 310 included in the basket 300. In this process, a dewatering effect by blowing may be added to the slurry cake 10. That is, by further imparting the dewatering effect based on blowing to the slurry cake 10 with the second gas as well as the first gas described above, there is an effect of further lowering the moisture content of the slurry cake 10.

The second gas discharged through the plurality of holes 310 included in the basket 300 may be discharged to the outside through the gas outlet 130 included in the external case 100.

According to an embodiment of the present invention, the first gas and the second gas may be the same or different from each other, and may independently be air in the atmosphere or an inert gas.

As a specific example, the first gas and the second gas may be the same or different from each other and may independently include one or more inert gases selected from the group consisting of nitrogen, neon, helium, and argon. As such, when the first gas and the second gas each include an inert gas, explosion or fire due to contact with oxygen may be prevented.

As a more specific example, when the slurry is a polymer slurry, the first gas and the second gas may each include an inert gas, thereby preventing an additional side reaction of the polymer.

In addition, the gas is used for dewatering of the slurry, and a gas having moisture content of 20% or less, 10% or less, or 5% or less may be used.

According to an embodiment of the present invention, the first gas and the second gas discharged to the outside of the external case 100 may be re-introduced into the inside of the basket 300. That is, the first gas and the second gas discharged to the outside of the basket 300 may be discharged to the outside of the external case 100 through the gas outlet 130, and then re-introduced into the inside of the basket 300.

Here, the first gas and the second gas may be re-introduced through the feed supply pipe 200 or the gas supply pipe 700. In order for the first gas and the second gas to be re-introduced through the feed supply pipe 200, a pipe connecting the gas outlet 130 and the feed supply pipe 200 may be further provided, and in a case in which the first gas and the second gas are re-introduced through the gas supply pipe 700, a pipe connecting the gas outlet 130 and the gas supply pipe 700 may be further provided.

According to an embodiment of the present invention, the liquid discharged through the liquid outlet 110 and the slurry cake 10 discharged through the slurry cake outlet 120 may have a downward flow inside the basket 300 due to a difference in density with the first gas, and the first gas or the second gas discharged through the gas outlet 130 may have an upward flow inside the basket 300 due to a difference in density between the liquid and the slurry cake 10.

Accordingly, the liquid outlet 110 and the slurry cake outlet 120 may be included at a lower portion of the external case 100, and the gas outlet 130 may be included at an upper portion of the external case 100. Here, the "upper portion" may refer to a portion corresponding to a height of 50% or higher, 70% or higher, or 80% or higher from a total height of the external case 100, and the "lower portion" may refer to a portion corresponding to a height less than 50%, less than 30%, or less than 10% from the total height of the external case 100.

According to an embodiment of the present invention, since the continuous centrifugal dewatering device according to the present invention includes the non-contact seal 500 and the gas inlet 600 for preventing the first gas from flowing into the space between the external case 100 and the basket 300 while the first gas is supplied, the dewatering performance of the slurry may be further improved, compared to the continuous centrifugal dewatering device of the related art.

In particular, when the slurry is a polymer slurry, a dewatering rate of moisture contained in the pores of polymer particles with developed pores may be increased to obtain the slurry cake 10 having a moisture content less than 10%, less than 6%, or less than 3% from the polymer slurry. Accordingly, energy consumed during a subsequent drying process may be reduced.

As described above, the continuous centrifugal dewatering device according to the present invention is illustrated and shown in the description and drawings, but the descriptions and drawings show only the essential components for understanding the present invention, and a process and device not described or illustrated other than the process and device shown in the descriptions and drawings may be appropriately applied and used to implement the continuous centrifugal dewatering device according to the present invention.

The invention claimed is:

1. A continuous centrifugal dewatering device comprising:

an external case having an internal space;

a feed supply pipe to which a slurry as a mixture of a solid and a first liquid is supplied;

a basket provided inside the external case, configured to receive a first gas and the slurry provided thereto and rotate to apply centrifugal force to the slurry;

a plurality of holes formed in the basket and configured to discharge a second liquid filtered from the slurry to an outside of the basket;

a pusher plate provided inside the basket and configured to discharge a slurry cake attached to an inner circumferential surface of the basket to an outside of the external case;

a non-contact seal configured to prevent the first gas from flowing into a space between the external case and the basket; and a gas inlet to which a second gas, which flows in a reverse direction with respect to a flow direction of the first gas flowing to the space between the external case and the basket, is continuously supplied, wherein the first gas is discharged externally from the basket through the plurality of holes formed in the basket, wherein basket has a cylindrical shape, and the gas inlet is provided in a form of one or more pores formed along a circumference of the basket, and wherein the gas inlet is positioned between the plurality of holes and the non-contact seal.

2. The continuous centrifugal dewatering device of claim 1, wherein the first gas is mixed with the slurry to form a mixed feed, and the mixed feed is supplied to the feed supply pipe.

3. The continuous centrifugal dewatering device of claim 1, further comprising:

a gas supply pipe configured to supply the first gas into the basket.

4. The continuous centrifugal dewatering device of claim 1, wherein the first gas and the second gas are the same or different from each other and each independently comprises an inert gas.

5. The continuous centrifugal dewatering device of claim 1, wherein the non-contact seal is attached to the external case and spaced apart from the basket.

6. The continuous centrifugal dewatering device of claim 1, wherein the non-contact seal is attached to the basket and spaced apart from the external case.

7. The continuous centrifugal dewatering device of claim 1, further comprising:

a dispersing plate provided inside the basket and configured to disperse the slurry supplied from the feed supply pipe to an inside of the basket.

8. The continuous centrifugal dewatering device of claim 7, wherein the dispersing plate includes a support connected to the feed supply pipe to support the dispersing plate.

9. The continuous centrifugal dewatering device of claim 1, wherein the slurry is a polymer slurry generated by a polymerization.

* * * * *